United States Patent
Kar

(10) Patent No.: US 7,945,397 B2
(45) Date of Patent: May 17, 2011

(54) SYSTEM AND METHOD FOR GEARBOX HEALTH MONITORING

(75) Inventor: Chinmaya Kar, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 9 days.

(21) Appl. No.: 12/417,475

(22) Filed: Apr. 2, 2009

(65) Prior Publication Data

US 2010/0256932 A1 Oct. 7, 2010

(51) Int. Cl.
*G01B 3/44* (2006.01)
(52) U.S. Cl. .......................................... 702/34
(58) Field of Classification Search .................... 702/34, 702/35
See application file for complete search history.

(56) References Cited

U.S. PATENT DOCUMENTS

| | | | |
|---|---|---|---|
| 5,262,958 A | 11/1993 | Chui et al. | |
| 5,381,697 A | 1/1995 | van der Pol | |
| 5,594,180 A | 1/1997 | Carpenter et al. | |
| 5,616,824 A | 4/1997 | Abdel-Malek et al. | |
| 5,641,891 A | 6/1997 | Frankl et al. | |
| 5,646,600 A | 7/1997 | Abdel-Malek et al. | |
| 5,750,879 A | 5/1998 | Ohtsuka et al. | |
| 5,966,674 A | 10/1999 | Crawford et al. | |
| 6,208,943 B1 | 3/2001 | Randolph et al. | |
| 6,408,676 B1 | 6/2002 | Stratton et al. | |
| 6,505,517 B1 | 1/2003 | Eryurek et al. | |
| 6,507,789 B1 * | 1/2003 | Reddy et al. ................... | 702/34 |
| 6,539,315 B1 | 3/2003 | Adams et al. | |
| 6,654,697 B1 | 11/2003 | Eryurek et al. | |
| 6,725,167 B2 | 4/2004 | Grumstrup et al. | |
| 7,257,501 B2 | 8/2007 | Zhan et al. | |
| 7,274,995 B2 | 9/2007 | Zhan et al. | |
| 7,286,945 B2 | 10/2007 | Zhan et al. | |
| 7,421,374 B2 | 9/2008 | Zhan et al. | |
| 2003/0019297 A1 | 1/2003 | Fiebelkorn et al. | |
| 2003/0216888 A1 | 11/2003 | Ridolfo | |
| 2004/0024568 A1 | 2/2004 | Eryurek et al. | |
| 2005/0104020 A1 | 5/2005 | Zhan et al. | |
| 2006/0025970 A1 | 2/2006 | Wegerich | |
| 2007/0088534 A1 | 4/2007 | MacArthur et al. | |

OTHER PUBLICATIONS

Lathi, B. P., Linear Systems and Signals, 1992, Berkeley-Cambridge Press, p. 574-580.*
Simon G. Braun, "The Signature Analysis of Sonic Bearing Vibrations", IEEE Transactions on Sonics and Ultrasonics, vol. SU-27, No. 6, Nov. 1980, pp. 317-327.

(Continued)

*Primary Examiner* — Drew A Dunn
*Assistant Examiner* — Stephen J Cherry
(74) *Attorney, Agent, or Firm* — Munck Carter, LLP

(57) ABSTRACT

A system includes a plurality of sensors configured to measure one or more characteristics of a gearbox. The system also includes a gearbox condition indicator device, which includes a plurality of sensor interfaces configured to receive input signals associated with at least one stage of the gearbox from the sensors. The gearbox condition indicator device also includes a processor configured to identify a fault in the gearbox using the input signals and an output interface configured to provide an indicator identifying the fault. The processor is configured to identify the fault by determining a family of frequencies related to at least one failure mode of the gearbox, decomposing the input signals using the family of frequencies, reconstructing a gear signal using the deconstructed input signals, and comparing the reconstructed gear signal to a baseline signal. The family of frequencies includes a gear mesh frequency and its harmonics.

20 Claims, 14 Drawing Sheets

OTHER PUBLICATIONS

Horch A, "A Simple Method for Detection of Stiction in Control Valves", Control Engineering Practice, Pergamon Press, Oxford, GB, vol. 7, 1999, pp. 1221-1231.
Jiang Wanlu et al., "Applying Multiresolution Analysis for Processing of Hydraulic Pump Fault Signal", Fifth International Conference on Fluid Power Transmission and Control, Hangzhou, China, Apr. 2001, pp. 1-5.
Fujun He et al. "WPT-SVMs Based Approach for Fault Detection of Valves in Reciprocating Pumps", Proceedings of the American Control Conference, Anchorage, AK, May 8-10, 2002, pp. 4566-4570.
Mallat et al., "Singularity Detection and Processing with Wavelets", Mar. 1992, IEEE Transactions on Information Theory, vol. 38, No. 2, pp. 617-643.
Wang et al., "The Fault Character of the Motors Identified Based on Wavelet Transform", Nov. 2-5, 2003, Proceedings of the Second International Conference on Machine Learning and Cybernetics, Xi'an, pp. 2394-2398.
Gao et al., Support Vector Machines Based Apprroach for Fault Diagnosis of Valves in Reciprocating Pumps, 2002 IEEE Canadian Conference, pp. 1622-1627.
Ren et al., Fault Feature Extracting by Wavelet Transform for Control System Fault Detection and Diagnosis, 2000 IEEE, International Conference on Control Applications, pp. 485-489.
International Search Report for PCT/US2004/038766, issued by the International Searching Authority, mailed Apr. 14, 2005, by the European Patent Office, P.B. 5818 Patentlaan 2, NL-2280 HV Rijswijk.
Parvez S. et al., A Wavelet-Based Multi-Resolution PID Controller, 2003 IEEE Conference, Salt Lake City, UT, Oct. 2003, vol. 3 of 3, Conf. 38, pp. 1-5.
Zhihan Xu et al., Design of-Fault Detection and Isolation Via Wavelet Analysis and Neural Network, 2002 IEEE International Symposium, Vancouver, Canada, Oct. 2002, pp. 467-472.
Song Zhihuan et al., Adaptive Predictive Control Based on Wavelet Approximation Models, IEEE Conference, Beijing China, Oct. 1996, vol. 2, pp. 820-824.
Xiaohua Xia et al., Nonlinear Adaptive Predictive Control Based on Orthogonal Wavelet Networks, Shanghai China, Jun. 2002, vol. 1, pp. 305-311.
Nounou M N et al., Multiscale Fuzzy System Identification, Journal of Process Control, Oxford, GB, vol. 15, No. 7, Oct. 2005, pp. 763-770.
Billings S A et al., Discrete Wavelet Models for Identification and Qualitative Analysis of Chaotic Systems, Singapore, SG, vol. 9, No. 7, Jul. 1999, pp. 1263-1284.
A. R. Mohanty, et al., "Fault Detection in a Multistage Gearbox by Demodulation of Motor Current Waveform", IEEE Transactions on Industrial Electronics, vol. 53, No. 4, Aug. 2006, p. 1285-1297.
Chinmaya Kar, et al., "Monitoring gear vibrations through motor current signature analysis and wavelet transform", Mechanical System and Signal Processing 20 (2006), p. 158-187.
Chinmaya Kar, "System and Method for Determining Health Indicators for Impellers", U.S. Appl. No. 12/417,452, filed Apr. 2, 2009.
Chinmaya Kar, et al., "Vibration and current transient monitoring for gearbox fault detection using multiresolution Fourier transform", Journal of Sound and Vibration 311 (2008), Available online Oct. 23, 2007, p. 109-132.
Y. Gao et al., "Wavelet-Based Pressure Analysis for Hydraulic Pump Health Diagnosis", Transactions of the ASAE, vol. 46(4), May 2003, p. 969-976.

* cited by examiner

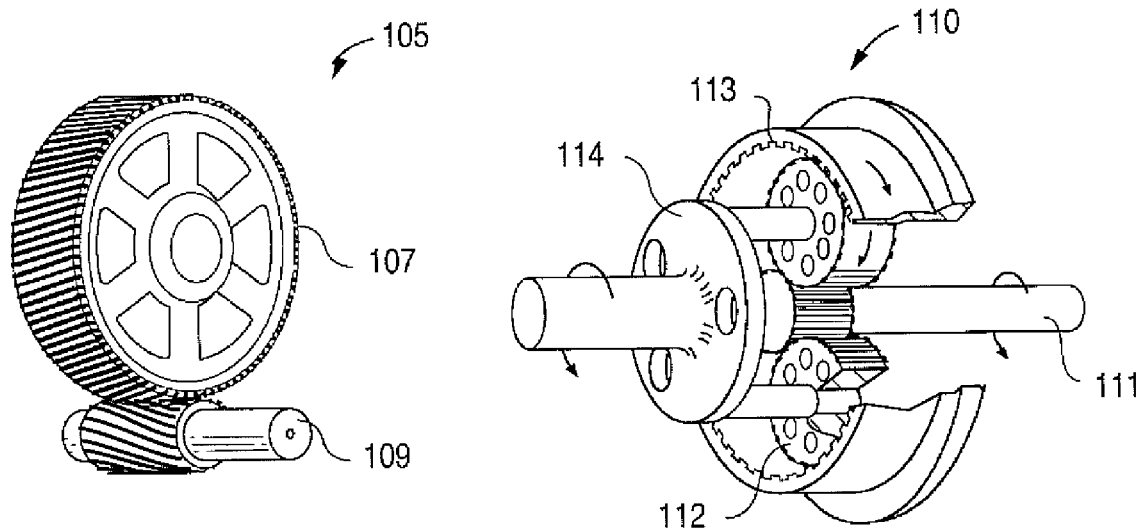
FIG. 1A
(PRIOR ART)
FIG. 1B
(PRIOR ART)
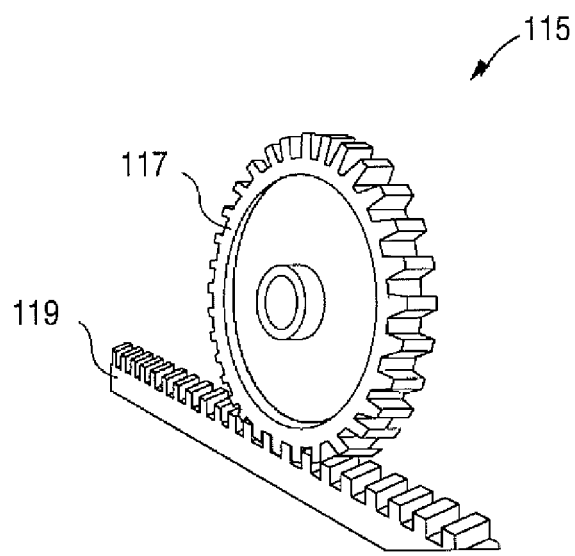
FIG. 1C
(PRIOR ART)

ADHESIVE WEAR

ABRASIVE WEAR

FATIGUE WEAR

CHEMICAL WEAR

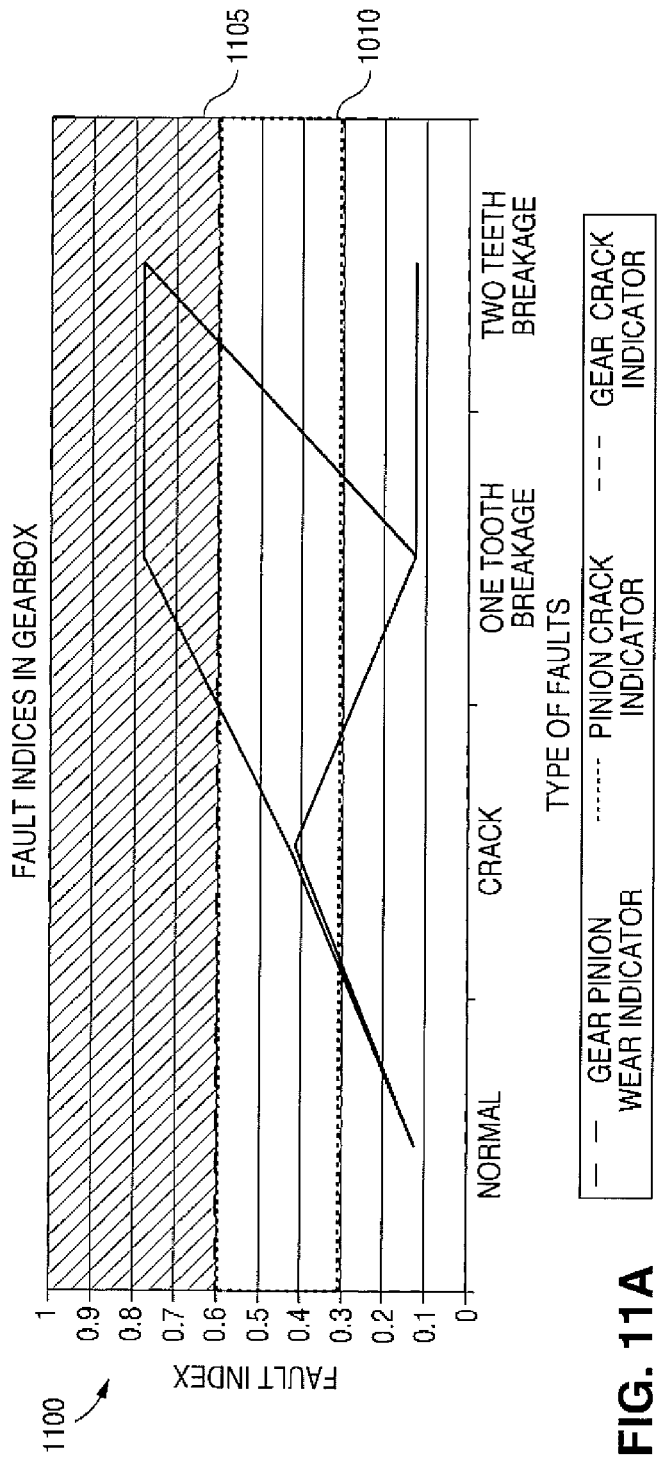
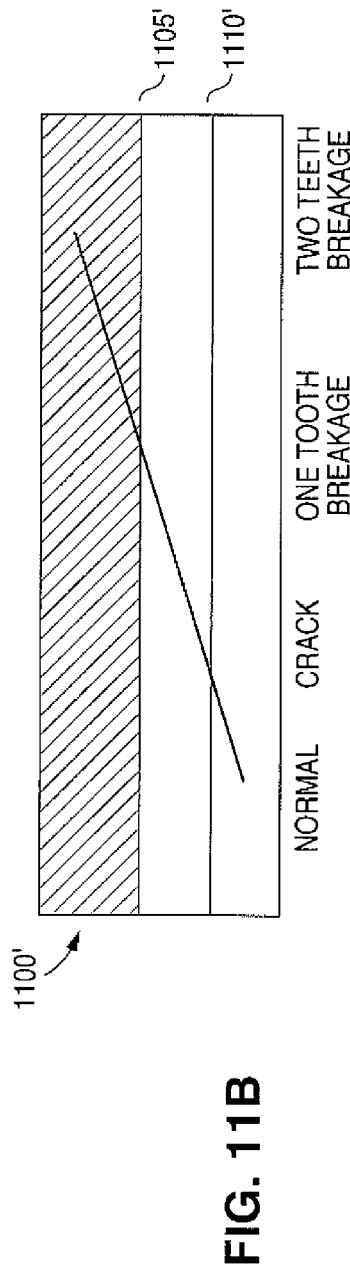
FIG. 11A
FIG. 11B

SYSTEM AND METHOD FOR GEARBOX HEALTH MONITORING

TECHNICAL FIELD

This disclosure relates generally to gearbox devices and more specifically to a system and method for gearbox health monitoring.

BACKGROUND

Gearboxes are omnipresent components in any industry. Gearbox uses often include speed reduction and power transmission. A gearbox can be a single-stage gearbox or a multi-stage gearbox. Further, a gearbox typically includes external gearing, internal gearing, and rack and pinion gearing.

One survey has found that gearbox failures account for thirty-four percent (34%) of all failure modes (e.g., fatigue) in aircraft. Another survey has revealed that gearbox failures account for fifteen percent (15%) of all failures in a specific industry. Gearbox failures typically result in lost revenues due to plant downtime since backup alternatives to units with failed gearboxes in these plants are often not available. Accordingly, detecting potential failures (e.g., faults) in a gearbox at the incipient stage can assist in preventing secondary damage, save maintenance costs, improve plant uptimes (e.g., machine availability), save potential financial losses from plant downtime, and assist towards increasing productivity.

SUMMARY

This disclosure provides a system and method for gearbox health monitoring.

In a first embodiment, an apparatus includes an input interface configured to receive an input signal associated with at least one stage of a gearbox. The apparatus also includes a processor configured to identify a fault in the gearbox using the input signal. The apparatus further includes an output interface configured to provide an indicator identifying the fault. The processor is configured to identify the fault by determining a family of frequencies related to at least one failure mode of the gearbox, decomposing the input signal using the family of frequencies, reconstructing a gear signal using the deconstructed input signal, and comparing the reconstructed gear signal to a baseline signal. The family of frequencies includes a gear mesh frequency and its harmonics.

In a second embodiment, a system includes a plurality of sensors configured to measure one or more characteristics of a gearbox. The system also includes a gearbox condition indicator device, which includes a plurality of sensor interfaces configured to receive input signals associated with at least one stage of the gearbox from the sensors. The gearbox condition indicator device also includes a processor configured to identify a fault in the gearbox using the input signals and an output interface configured to provide an indicator identifying the fault. The processor is configured to identify the fault by determining a family of frequencies related to at least one failure mode of the gearbox, decomposing the input signals using the family of frequencies, reconstructing a gear signal using the deconstructed input signals, and comparing the reconstructed gear signal to a baseline signal. The family of frequencies includes a gear mesh frequency and its harmonics.

In a third embodiment, a method includes receiving an input signal having vibration and/or speed information corresponding to at least one stage of a gearbox. The method also includes determining a family of frequencies corresponding to at least one failure mode of the gearbox, where the family of frequencies includes a gear mesh frequency and its harmonics. The method further includes decomposing the input signal using the family of frequencies and reconstructing a gear signal using the deconstructed input signal. In addition, the method includes comparing the reconstructed gear signal to a baseline signal and outputting an indicator identifying a fault when the reconstructed gear signal differs from the baseline signal by a threshold amount.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 1A through 1D illustrate example gear structures;

FIGS. 11A and 11B illustrate example gear health indicators according to this disclosure.

DETAILED DESCRIPTION

FIGS. 1A through 11B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Also, it will be understood that elements in the figures are illustrated for simplicity and clarity and have not necessarily been drawn to scale. For example, the dimensions of some elements in the figures may be exaggerated relative to other elements to help improve the understanding of various embodiments described in this patent document.

FIGS. 1A through 1D illustrate example gear structures. The embodiments of the gear structures shown in FIGS. 1A through 1D are for illustration only. Other gear structures could be used without departing from the scope of this disclosure.

Figure 1D:
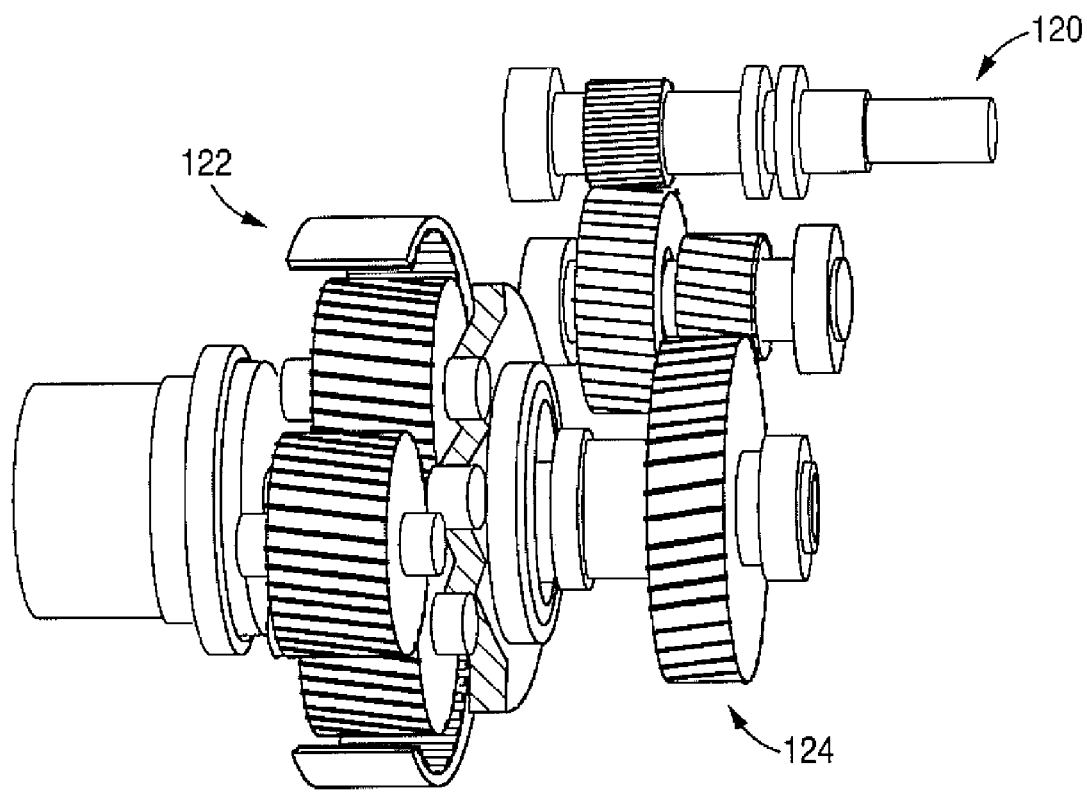

A gearbox can include one or more types of gears, such as external gearing 105 (FIG. 1A), internal gearing 110 (FIG. 1B), and rack and pinion gearing 115 (FIG. 1C). A gearbox can be a single-stage gearbox (as shown in FIGS. 1A through 1C) or a multi-stage gearbox 120 (as shown in FIG. 1D).

The external gearing 105 illustrated in FIG. 1A is a helical gear. Here, the external gearing 105 is a single stage that includes a gear 107 and a pinion 109. However, other embodiments, such as those where the external gearing 105 is a spur gear, could also be used.

The internal gearing 110 illustrated in FIG. 1B also is a single-stage gearing structure. The internal gearing includes a sun gear 111, a planet gear 112, a ring gear 113, and a planet carrier 114.

The rack and pinion gearing 115 illustrated in FIG. 1C is again a single-stage gearing structure. The rack and pinion gearing 115 includes a pair of gears 117, 119 that convert rotational motion into linear motion. The circular pinion 117 engages teeth on the rack 119. Rotational motion applied to the pinion 117 causes the rack 119 to move to the side, up to the limit of its travel. For example, in a railway, the rotation of a pinion 117 mounted on a locomotive or a railcar engages a rack 119 between the rails and pulls a train along a steep slope.

The multi-stage gearbox 120 illustrated in FIG. 1D includes a first stage 122 and a second stage 124. It will be understood that illustration of two stages is for example purposes only. Embodiments of the multi-stage gearbox 120 including more than two stages could also be used. In this example, the first stage 122 is configured as an internal gearing 110, and the second stage 124 is configured as an external gearing 105. As such, the first stage is representative of a single-stage internal gearbox, and the second stage 124 includes several gears and pinions coupled to form a multi-stage external gearing.

Although only a few gear types have been illustrated here, many other gear types could be used. The other gear types can include, but are not limited to, gearboxes with parallel shafts, intersecting shafts, and/or non-intersecting and non-parallel shafts. Parallel shafts can include spur gears, single helical gears, and double helical gears. Intersecting shafts can include bevel gears, coniflex bevel gears, zerol bevel gears, spiral bevel gears, miter gears, angular gears, and crown gears. Non-intersecting and non-parallel shafts can include crossed helical gears, hypoid gears, and worm gears.

A fault, or failure, may occur in a gearbox formed using any one or more of the gear types listed above or other gear types. The failure can occur in a gear, a pinion, or both. Gear failures include wear, cracking, tooth breakage, static and dynamic transmission error, plastic flow, scoring and scuffing, surface fatigue, spalling, and backlash.

Figure 2A:
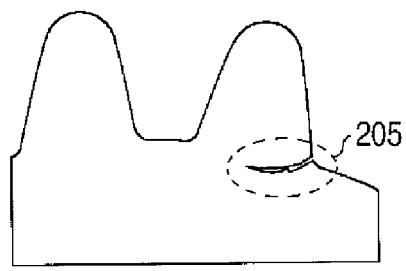
FIGS. 2A through 2E illustrate example cracks and wear experienced by gears.
Figure 2B:
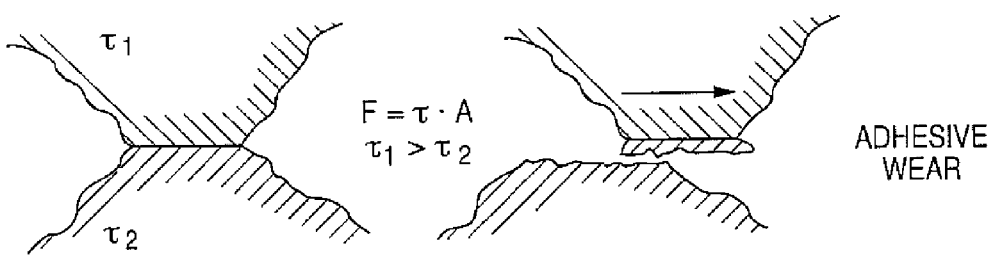
Figure 2C:
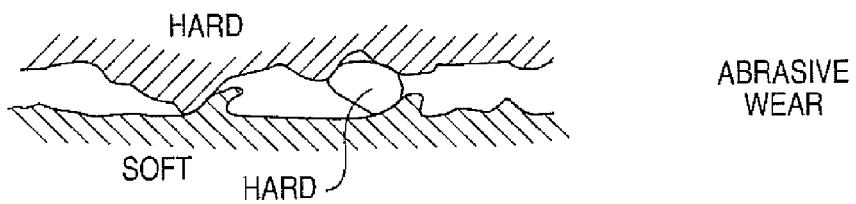
Figure 2D:
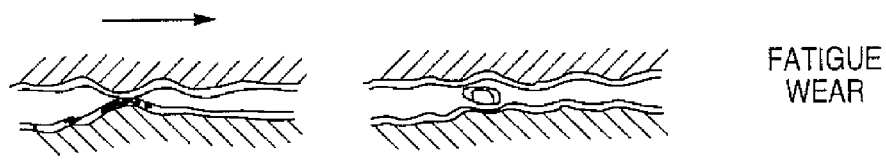
Figure 2E:
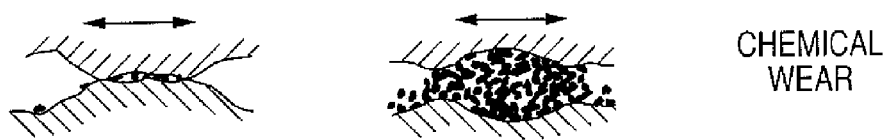

FIGS. 2A through 2E illustrate example cracks and wear experienced by gears. FIG. 2A illustrates a fatigue crack 205. The fatigue crack 205 can lead to teeth breakage. Teeth breakage includes fatigue breakage, breakage due to heavy wear, and overload breakage. FIG. 2B illustrates an example of adhesive wear. FIG. 2C illustrates an example of abrasive wear. FIG. 2D illustrates an example of fatigue wear. FIG. 2E illustrates an example of chemical wear. These types of cracks and wear can be detected using the system described below. However, many other or additional types of damage also can be detected using the system described below.

In accordance with this disclosure, a system and method are provided that can identify and classify (e.g., isolate) a type of wear occurring on a gear. Further, the system and method can detect potential gearbox failures as a result of broken, cracked, and chipped teeth, wear, pitting, and resulting backlash.

Figure 3:
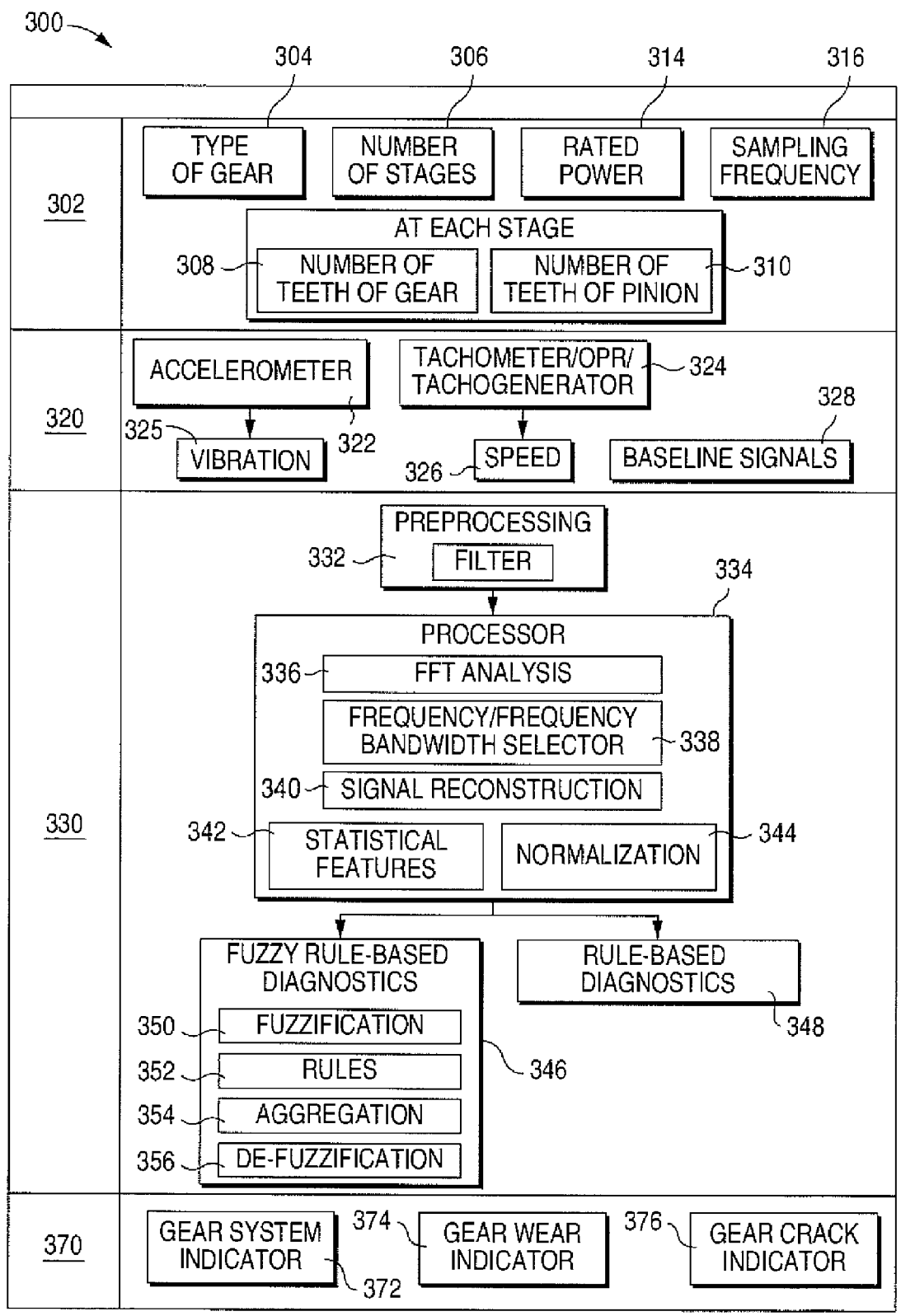
FIG. 3 illustrates an example Gearbox Condition Indicator (GCI) device according to this disclosure.

FIG. 3 illustrates an example Gearbox Condition Indicator (GCI) device 300 according to this disclosure. The embodiment of the GCI device 300 shown in FIG. 3 is for illustration only. Other embodiments of the GCI device 300 could be used without departing from the scope of this disclosure.

In this example, the GCI device 300 includes a user configuration portion 302. The user configuration portion 302 provides a user interface that facilitates operator interaction with the GCI device 300. For example, the user configuration portion 302 may enable an operator to enter gearbox configuration information. As particular examples, the user configuration portion 302 may allow the operator to enter a type of gear 304 and the number of stages 306 of the gear. When entering the number of stages 306, the operator can also enter a number of teeth 308 and a number of pinions 310 for each stage. In addition, the operator can enter a rated power 314 for the type of gear 304 and a sampling frequency 316.

The GCI device 300 also includes a sensor signal portion 320. The sensor signal portion 320 provides an interface for receiving inputs from sensors coupled to, or otherwise associated with, the gear. In this example, the sensor signal portion 320 includes interfaces to an accelerometer 322 and a tachometer 324. The accelerometer 322 detects, measures, and records a vibration 325 of the gear. The tachometer 324 can be a sensor input device such as a tachogenerator or Once Per Revolution (OPR) device. The tachometer 324 detects, measures, and records speed 326 of the gear. The sensor signal portion 320 also can store baseline signals 328 for the gear. Interfaces to other, or additional types, of sensors could also be provided in the sensor signal portion 320, such as an interface to a Hall Effect sensor that detects, measures, and records a motor current, and one or more acoustics sensors that detect, measure and record noise.

The GCI device 300 further includes an Artificial Intelligence (AI) portion or other processing portion 330. In this example, the AI portion 330 includes a pre-processing filter 332 and a processor core 334. The processor core 334 can include one or more processors adapted to perform FFT Analysis 336, Frequency/Frequency Bandwidth Selection (FFBS) 338, signal reconstruction 340, statistical features determination 342, and normalization 344. The AI portion 330 is also able to perform Fuzzy Rule-Based Diagnostics 346 and Rule-Based Diagnostics 348. The Fuzzy Rule-Based Diagnostics 346 includes Fuzzification 350, Rules 352, Aggregation 354, and De-fuzzification 356. These functions are described in detail below.

In addition, the GCI device 300 includes an output interface 370. The output interface 370 represents an interface configured to send information to another system or device, such as a computer or a display. The output interface 370 could also represent a single display (e.g., a monitor) or multiple displays. In this example, the output interface 370 includes a gear system indicator 372, a gear wear indicator 374, and a gear crack indicator 376. In some embodiments, the output interface 370 may also include a pinion crack indicator (if applicable or desired). These indicators 372-376 identify the health of the gearbox being monitored.

Figure 4A:
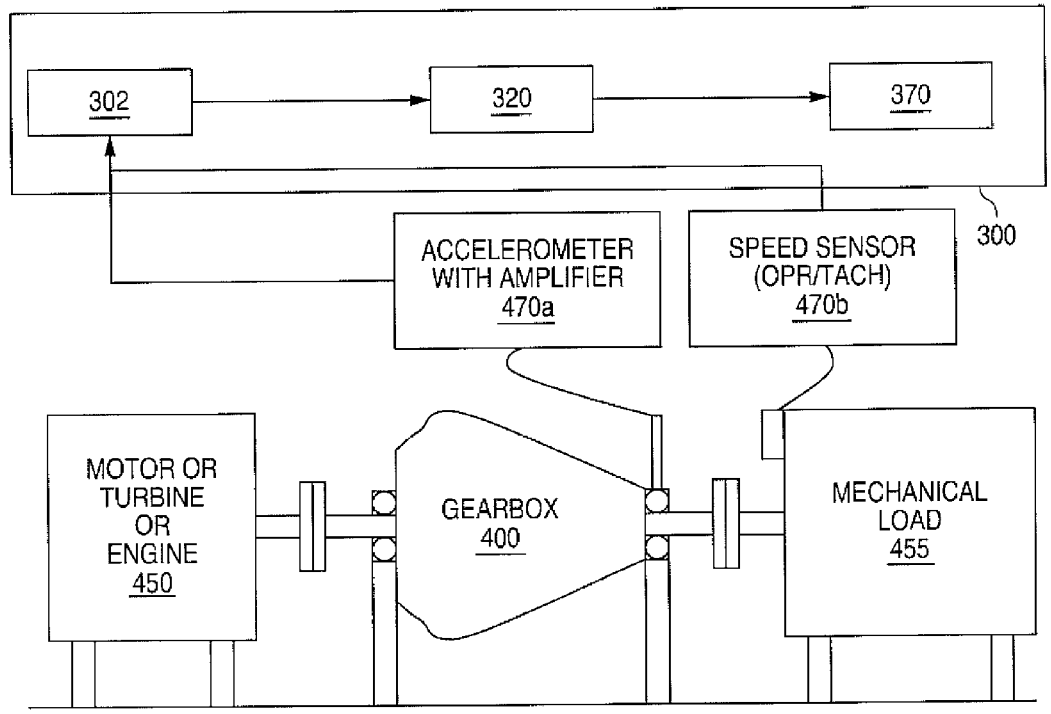
FIGS. 4A and 4B illustrate an example GCI device and an associated gearbox according to this disclosure.
Figure 4B:
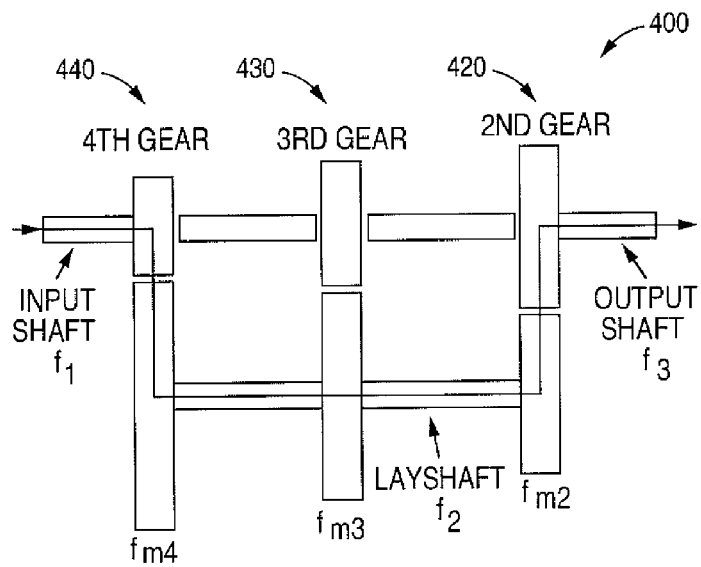

FIGS. 4A and 4B illustrate an example GCI device 300 and an associated gearbox 400 according to this disclosure. This use of the GCI device 300 is for illustration only. The GCI device 300 could be used in any other suitable manner without departing from the scope of this disclosure.

The gearbox 400 can include a number of gears as illustrated in FIG. 4B. In this example, the gearbox 400 includes a first gear (not shown), a second gear 420, a third gear 430, and a fourth gear 440.

As a particular example shown in FIG. 4A, an automotive transmission gearbox 400 is coupled on a first side to an induction motor 450 and on a second side to a mechanical load unit 455. Various probes 470a-470b (including an accelerometer 470a) are coupled between the GCI device 300 and the gearbox 400, the motor 450, and the mechanical load unit 455. The probes 470 measure vibration, motor current, noise, and speed of the gearbox 400.

The GCI device 300 can identify and classify wear and pitting occurring in the gearbox 400. The GCI device 300 can also monitor vibration in the gearbox 400 by monitoring various Families of Frequencies. The various Families of Frequencies include, but are not limited to, Gear Mesh Frequencies (GMFs) and harmonics. For example, a first family of frequencies includes a gear mesh frequency at a stage and its harmonics; a second family of frequencies includes the sidebands of the gear shaft across the first family of frequencies; a third family of frequencies includes the sidebands of the pinion shaft across the first family of frequencies; a fourth family of frequencies refers to the noise floor in all the above mentioned frequencies; a fifth family of frequencies can be a tooth hunting frequency and its harmonics. These functions are described in more detail below.

Figure 5A:
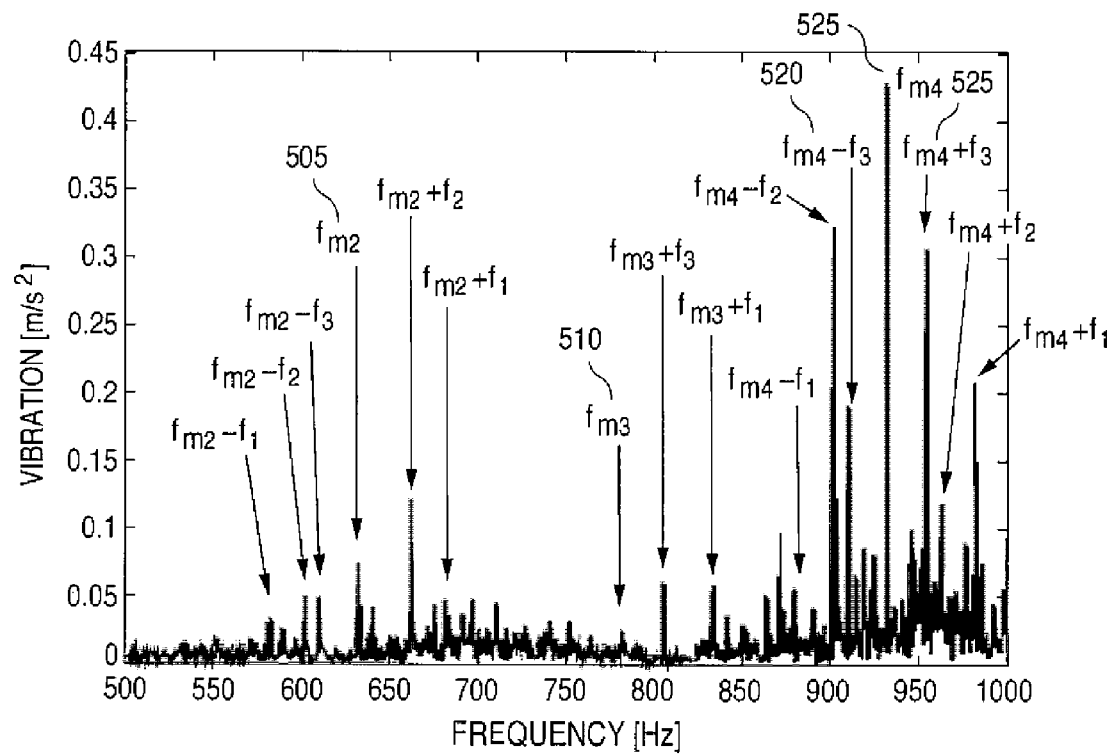
FIGS. 5A and 5B illustrate example graphs of Gear Mesh Frequencies (GMFs) for a normal operating gear and for a gear with two broken teeth according to this disclosure.
Figure 5B:
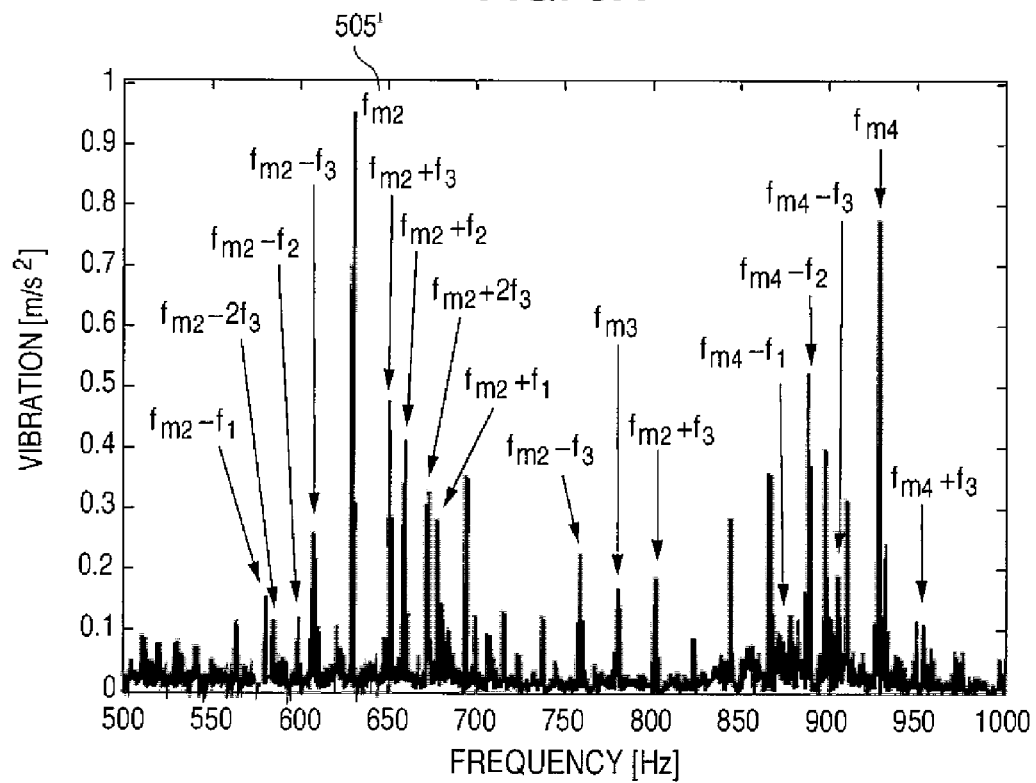

FIGS. 5A and 5B illustrate example graphs of Gear Mesh Frequencies (GMFs) for a normal operating gear and for a gear with two broken teeth according to this disclosure. The embodiments of the GMFs shown in FIGS. 5A and 5B are for illustration only. Other embodiments of the GMFs could be used without departing from the scope of this disclosure.

FIG. 5A illustrates GMFs for a normal operating gear. A GMF for the second gear 420 is represented by $f_{m2}$ 505, a GMF for the third gear 430 is represented by $f_{m3}$ 510, and a GMF fourth gear 440 is represented by $f_{m4}$ 515. Additionally, each GMF (i.e., $f_{m2}$ 505, $f_{m3}$ 510 and $f_{m4}$ 515) includes sideband frequencies denoted by "$-f_3$" and "$+f_3$". For example, the sideband frequencies for $f_{m4}$ 515 are $f_{m4}-f_3$ 520 and $f_{m4}+f_3$ 525. The GMFs can be represented by the following equation:

$$GMF = Speed_{Gear} T_{Gear} = Speed_{Pinion} T_{Pinion} \quad (1)$$

where T is the number of teeth for the gear or pinion.

FIG. 5B illustrates GMFs for a gear with two broken teeth. As seen here, vibration signals contain GMFs whose energy content increases as a result of the introduced defect. For example, a defect in the second gear 420 increases energy in the second GMF 505'. As a result of the broken teeth, the amplitude of the vibration of the second GMF 505 has increased from a value of 0.07 to a value of 0.95. Additionally, the amplitudes of the sidebands $f_{m2}-f_3$ 530 and $f_{m2}+f_3$ 535 have increased significantly.

The GCI device 300 measures and identifies the effects resulting from gear failure. For example, when tooth cracking/breakage occurs, since the amplitudes of all sidebands around the GMF may increase and an increase in a percentage of amplitude modulation may be experienced, the GCI device 300 measures the changes in amplitudes and classifies the failure according to the measured values. Table 1 illustrates some example failure modes and their respective effects:

TABLE 1

| FAULT | EFFECTS |
|---|---|
| Tooth wear or pitting | Amplitudes of GMFs and their harmonics may increase (in case of uniform wear). Flat and hub marks (caused during gear manufacturing) may induce large harmonics. Amplitudes of fractional GMFs may increase (in case of uneven wear or pitting). The 1.5GMF may specifically appear for pitch line runout and varying tooth width. Amplitudes of tooth hunting frequency and its harmonics may increase. Amplitudes of the natural frequencies may increase. Background noise may increase. |
| Gear looseness in its shaft | Amplitudes of the left sidebands of gear shaft frequency of each harmonic may be larger than the corresponding right sidebands. |
| Gear eccentricity in its shaft | Amplitudes of fractional GMFs may increase (in case of uneven wear or pitting). Amplitudes of the right sidebands of gear shaft frequency of each harmonic may be larger than the corresponding left sidebands. |
| Gear Misalignment | Amplitude of GMF = 2 * Amplitude of 2nd harmonic of GMF = 4 * Amplitude of 3rd harmonic of GMF Amplitude of GMF = 3 * Amplitude of 2nd harmonic of GMF = 6 * Amplitude of 3rd harmonic of GMF Amplitude of 4th harmonic of GMF and Amplitude of 5th harmonic of GMF appear. |
| Backlash | Amplitude of 2nd harmonic of GMF > Amplitude of GMF. Amplitude of 2nd harmonic of GMF > Amplitude of 3rd harmonic of GMF. |

Referring back to FIG. 3, an operator can enter the gear configuration for the gearbox 400 via the user configuration portion 302. For example, the operator could enter the type of gear 304 and enter "4" for the number of stages 306. Additionally, the operator can enter the number of teeth 308 and the number of pinions 310 for the first stage, the second stage 420, the third stage 430, and the fourth stage 440. The operator may further enter the rated power 314 of the gearbox 400 and the sampling frequency 316 that the GCI device 300 will use to monitor the gearbox 400.

The GCI device 300 receives sensor input signals from the sensors 470a-470n via a number of sensor interfaces. For example, the accelerometer 470c can detect, measure, and record a vibration of the gearbox 400. The GCI device 300 measures and records the sensor input signals of the gearbox 400 during normal operation and can store these normal sensor input signals as a set of baseline signals 328. FIG. 5A illustrates one example of a set of baseline signals.

The GCI device 300 continues to monitor the performance of the gearbox 400 by acquiring the input signal based on the sampling frequency 316. The GCI device 300 filters the input signals received from the probes 470a-470n using the filter function 332. The processor core 334 applies the FFT analysis 336 to all of the filtered signals. The FFT Analysis 336 may yield the relevant frequencies related to the system including the gearbox 400 being monitored.

The FFBS 338 isolates one or more frequencies and amplitudes that will be used in signal reconstruction 340 to reconstruct a signal. For example, the FFBS 338 isolates only those frequencies related to the specific stage of the gearbox 400 being monitored. Therefore, contributions from other components and other stages are eliminated. Reconstruction of a time-signal is performed using the isolated frequencies and their respective amplitudes. Once the signal is reconstructed using those selected frequencies and amplitudes, the processor core 334 determines statistical features 342 of the reconstructed signal. In some embodiments, the statistical feature 342 is a Root Mean Square (RMS) value. In some embodiments, the statistical features may include a standard deviation, kurtosis, Norm, D-stat. Thereafter, the processor core 334 produces a normalized signal by performing a normalization 344 of the reconstructed signal with respect to the baseline signal 328. The normalization of any features at any instant can be performed with respect to the feature of a baseline, or some average of features previously found. The GCI device 300 can then apply various rules to the normalized signal. These rules may include Fuzzy Rule-Based Diagnostics 346 and/or Rule-Based Diagnostics 348. The fuzzy rule-based diagnostics can have various combinations of membership functions and can apply various aggregation and defuzzification methods.

The GCI device 300 presents an output of the analysis via the output interface 370. In some embodiments, the GCI device 300 only provides an output when the GCI device 300 has determined that a fault condition exists (such as when the normalized signal differs from the baseline signals 328 by one or more threshold values). In these embodiments, the GCI device 300 can provide the output via the indicator associated with the failure (e.g., via the gear system indicator 372, the gear wear indicator 374, the gear crack indicator 376, or the pinion crack indicator depending on the detected fault). An alarm, or warning, can be provided to the user depending upon the values of the indicators (e.g., the gear system indicator 372, the gear wear indicator 374, and the gear crack indicator 376). For example, if any indicator is in the range of 0.3-0.6, then the indicators provide a warning. However, if the range is between 0.6-1.0, then the indicators provide an alarm. There may be other combination of alerts, alarms and/or warnings to users either by varying the alert thresholds or providing new alert names.

Figure 6A:
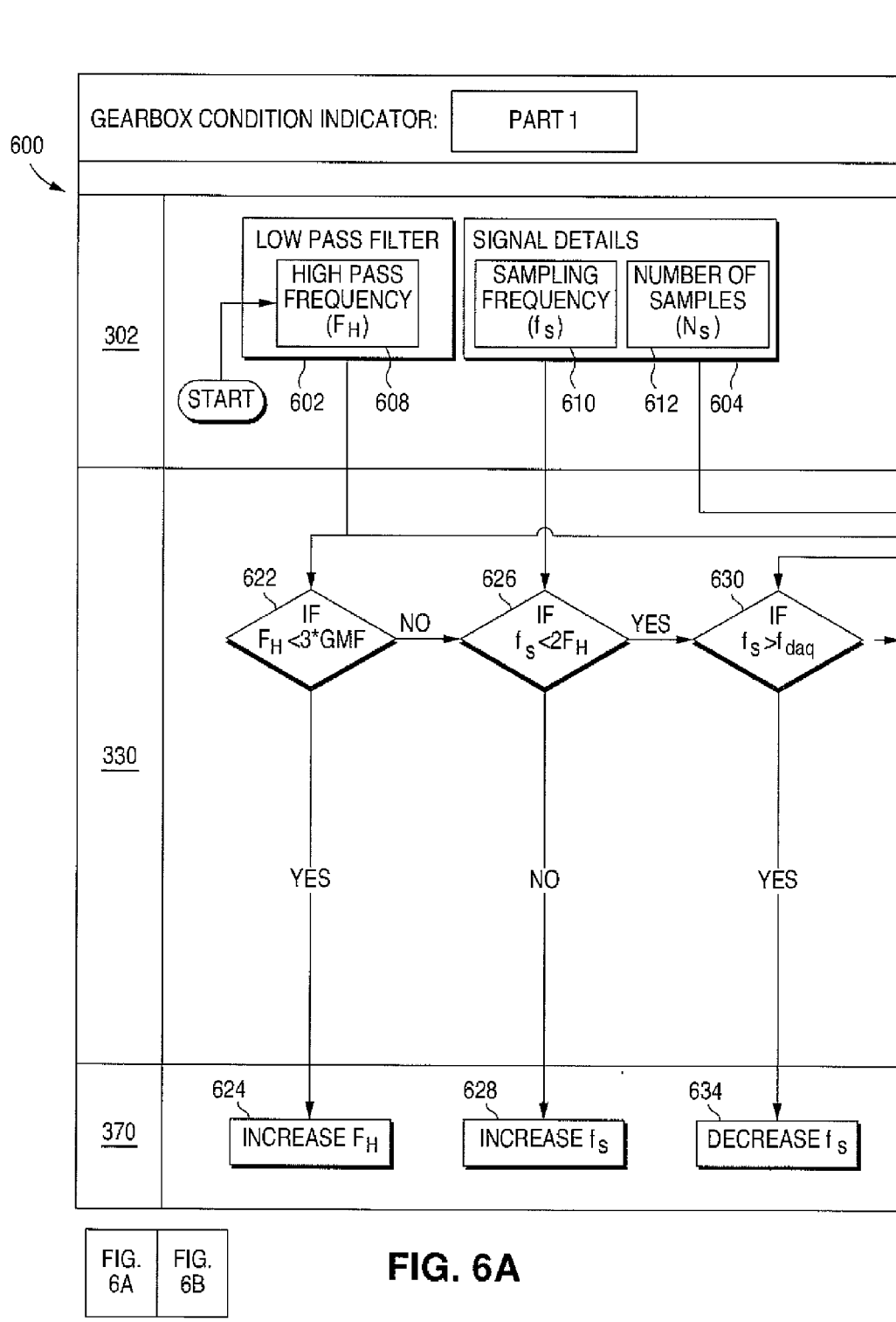
FIG. 6 illustrates a more detailed view of an example GCI first stage operation for monitoring a gearbox according to this disclosure.
Figure 6B:
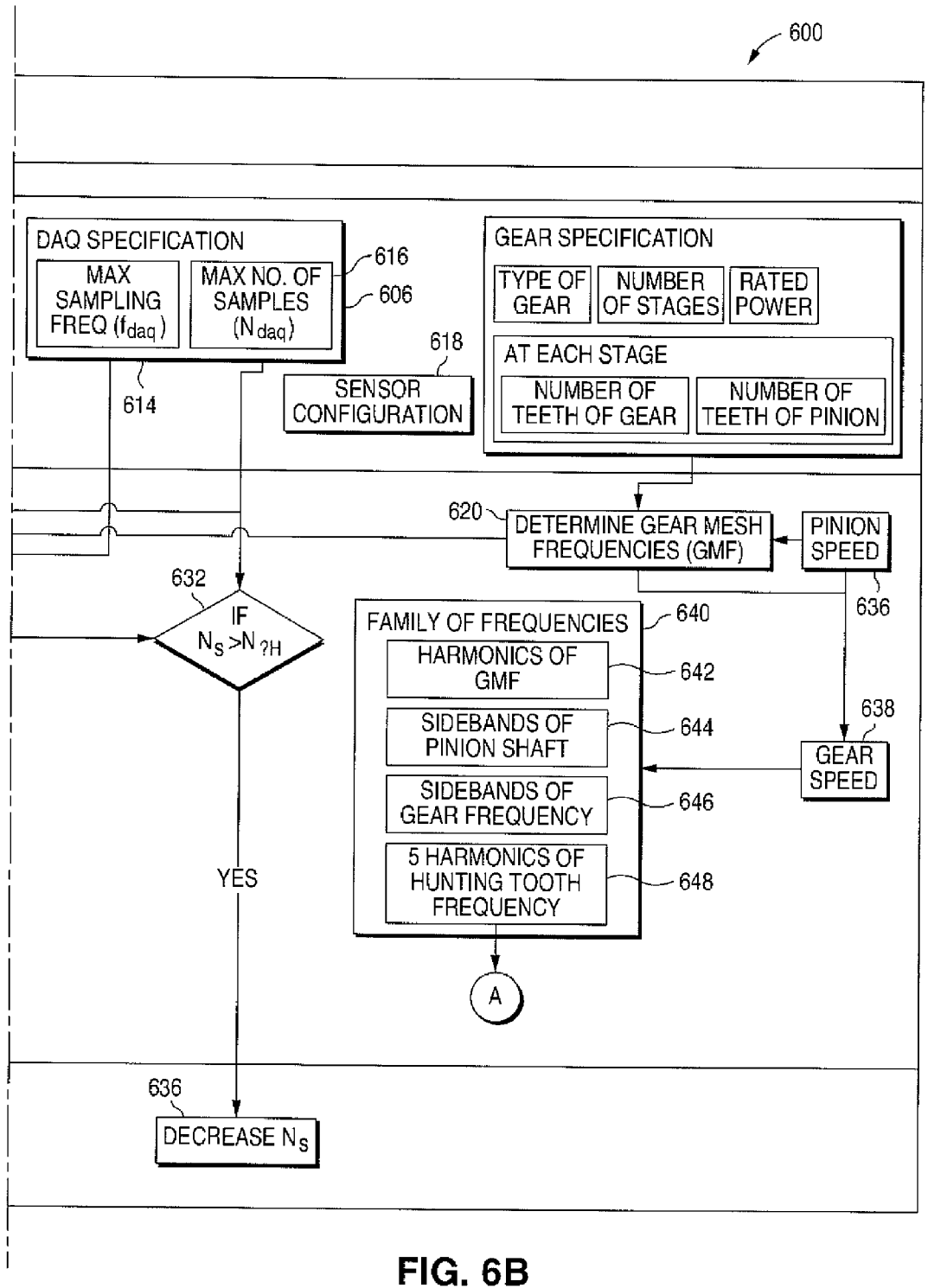

FIG. 6 illustrates a more detailed view of an example GCI first stage operation 600 for monitoring a gearbox according to this disclosure. The embodiment of the GCI first stage operation 600 shown in FIG. 6 is for illustration only. Other embodiments of the GCI first stage operation 600 could be used without departing from the scope of this disclosure.

As noted above, during a configuration stage, the operator can enter data relating to the gearbox to be monitored, such as gear type 304, number of stages 306, and rated power 314. As shown in FIG. 6, during the configuration stage, the operator can also enter low-pass filter information 602, signal details 604, and Data Acquisition (DAQ) specifications 606. The low-pass filter information 602 can include a high-pass frequency ($F_H$) 608 value. The signal details 604 can include a sampling frequency ($F_S$) 610 and a number of samples ($N_S$) 612 to be taken. The DAQ specification 606 can include a maximum sampling frequency ($F_{daq}$) 614 and a maximum number of samples ($N_{daq}$) 616. The operator can further enter the sensor configuration 618.

The GCI device 300 determines one or more GMFs 620 for each stage 420, 430, 440 of the gearbox 400. In particular embodiments, the AI portion 330 determines at least three harmonics for each GMF. It will be understood that although three harmonics for each GMF are illustrated, embodiments with more than three harmonics could be used.

The AI portion 330 determines if the operator has entered appropriate values for $F_H$ 608, $F_S$ 610, and $N_S$ 612. For example, the AI portion 330 compares the GMFs to $F_H$ 608 during a comparison 622. If $F_H$ 608 is less than three times the GMF ($F_H$<3×GMF), the AI portion 330 triggers an increase $F_H$ indicator 624 in the output interface 370 of the GCI device 300. The increase $F_H$ indicator 624 provides a visual or audible cue to the operator that the value entered for $F_H$ 608 is too low and should be increased.

Once the AI portion 330 has determined that a sufficient $F_H$ 608 has been entered, the AI portion 330 compares $F_H$ 608 to $F_S$ 610 during a comparison 626. If $F_S$ 610 is less than $F_H$ 608 ($F_S$<2$F_H$), the AI portion 330 triggers an increase $F_S$ indicator 628 in the output interface 370. The increase $F_S$ indicator 628 provides a visual or audible cue to the operator that the value entered for $F_S$ 610 is too low and should be increased. The AI portion 330 also compares the entered value for $F_S$ 610 to determine if it is greater than $F_{daq}$ 614 during a comparison 630. In the event $F_S$>$F_{daq}$, the AI portion 330 either disables the increase $F_S$ indicator 628 or illuminates a decrease $F_S$ indicator 634.

The AI portion 330 also compares $N_S$ 612 against the $N_{daq}$ 616 during a comparison 632. In the event that $N_S$ 612 is less than or equal to $N_{daq}$ 616 ($N_S$<$N_{daq}$), the AI portion 330 triggers an increase $N_S$ indicator 634 in the output interface 370. In the event that $N_S$ 612 is greater than $N_{daq}$ 616 ($N_S$>$N_{daq}$), the AI portion 330 can enable a decrease $N_S$ indicator 636.

The GCI device 300 receives the sensor input signals from the probes 470a-470n. The AI portion 330 is able to use the sensor input signals to determine additional measurements. For example, in the event that the GCI device 300 receives pinion speed 636 from a tachometer 324, the AI portion 330 can determine the gear speed 638 from the pinion speed 636.

The AI portion 330 also uses the sensor input signals to compute a Family of Frequencies (FoF) 640 for the sensor input signals. The FoF 640 includes harmonics 642 of each GMF, sidebands 644 of pinion shaft, sidebands 646 of gear frequency, and five (5) harmonics 648 of a Hunting tooth frequency. The Hunting tooth frequency can be determined as follows:

$$HTF = \frac{GMF \cdot N_a}{T_{Gear} \cdot T_{Pinion}} \quad (2)$$
$$= \frac{GMF \cdot N_a}{T_{Gear} \cdot T_{Pinion}}$$
$$= \frac{Speed_{Gear} \cdot N_a}{T_{Pinion}}$$
$$= \frac{Speed_{Pinion} \cdot N_a}{T_{Gear}}.$$

Figure 7:
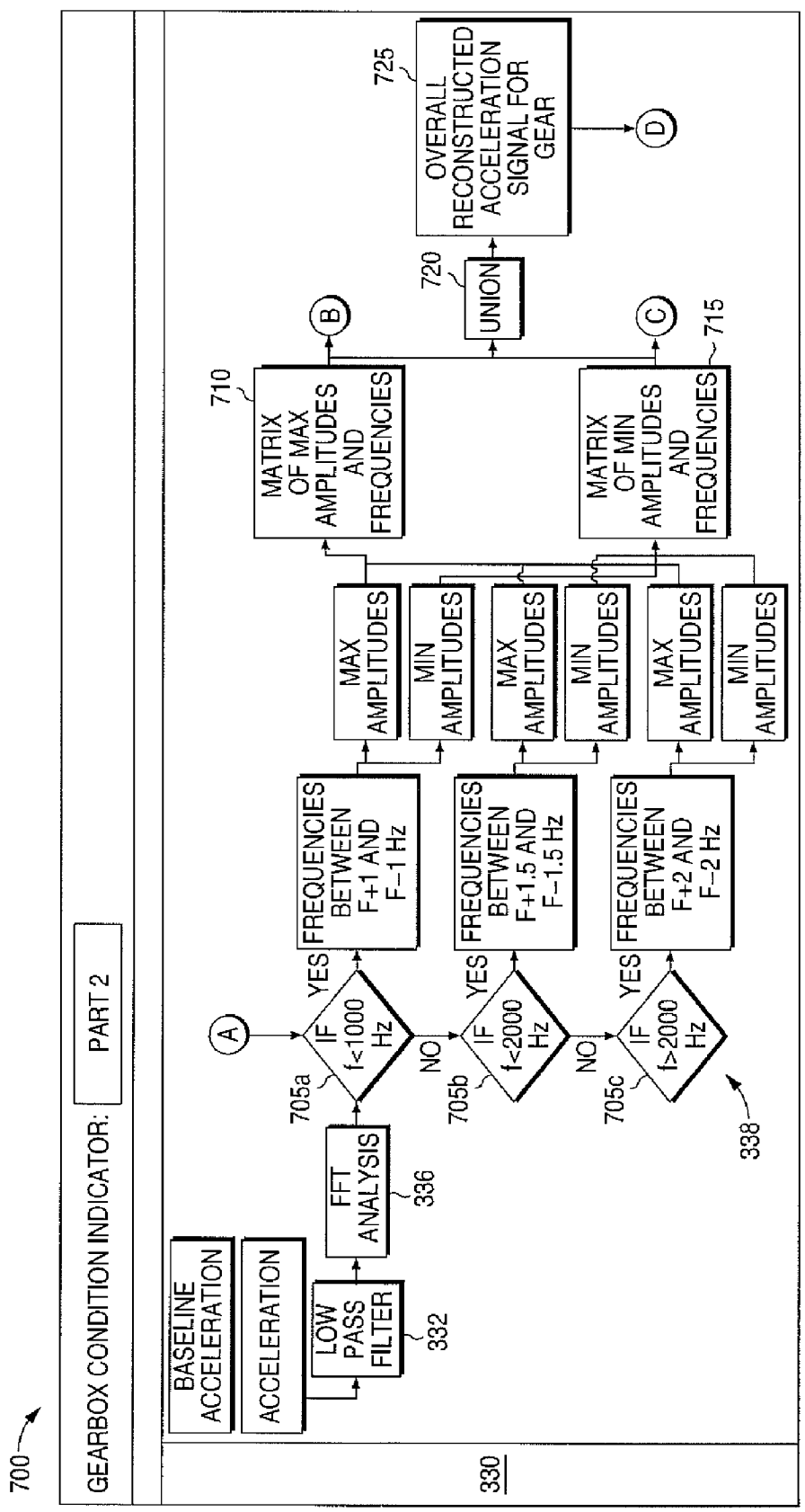
FIG. 7 illustrates a more detailed view of an example GCI second stage operation for monitoring a gearbox according to this disclosure.

FIG. 7 illustrates a more detailed view of an example GCI second part operation 700 for monitoring a gearbox according to this disclosure. The embodiment of the GCI second stage operation 700 shown in FIG. 7 is for illustration only. Other embodiments of the GCI second stage operation 700 could be used without departing from the scope of this disclosure.

After the AI portion 330 has computed the Family of Frequencies 640 for the sensor input signals, the AI portion 330 processes the FoF 640 through the low-pass filter 332 and applies the FFT analysis 336. The low-pass filter 332 can be a Butterworth filter, a wavelet-based filter, or any other low-pass filter. The FoF 640 is passed through the FFBS 338, which in this example includes a number of band-pass filter paths 705a-705c. A 2 Hz band (e.g., from f+1 Hz to f−1 Hz) 705a is applied to the signals from the FFT analysis 336 whose value is less than 1000 Hz (f<1000 Hz). A 3 Hz band (e.g., from f+1.5 Hz to f−1.5 Hz) 705b is applied to the signals from the FFT analysis 336 whose value is less than 2000 Hz but greater than or equal to 1000 Hz (1000 Hz≦f<2000 Hz). A 4 Hz band (e.g., from f+2 Hz to f−2 Hz) 705c is applied to the signals from the FFT analysis 336 whose value is greater than or equal to 2000 Hz (f≧2000 Hz). The bands incorporate any change in frequency due to speed fluctuation, deformation, deflection of the teeth structure, or any other reason.

The AI portion 330 computes the minimum and maximum amplitudes for each band 705a-705c. The AI portion 330 then combines each of the maximums from the bands 705a-705c to generate a matrix of maximum amplitudes and frequencies 710. The AI portion 330 also combines each of the minimums from the bands 705a-705c to generate a matrix of minimum amplitudes and frequencies 715. The AI portion 330 performs signal reconstruction 340 by creating a union 720 between the matrix of maximum amplitudes and frequencies 710 and the matrix of minimum amplitudes and frequencies 715. The union 720 yields an overall reconstructed signal 725 for the gear. In this example, the union 720 and reconstructed signal 725 determine an acceleration of the gear at a specific (e.g., monitored) stage.

Figure 8A:
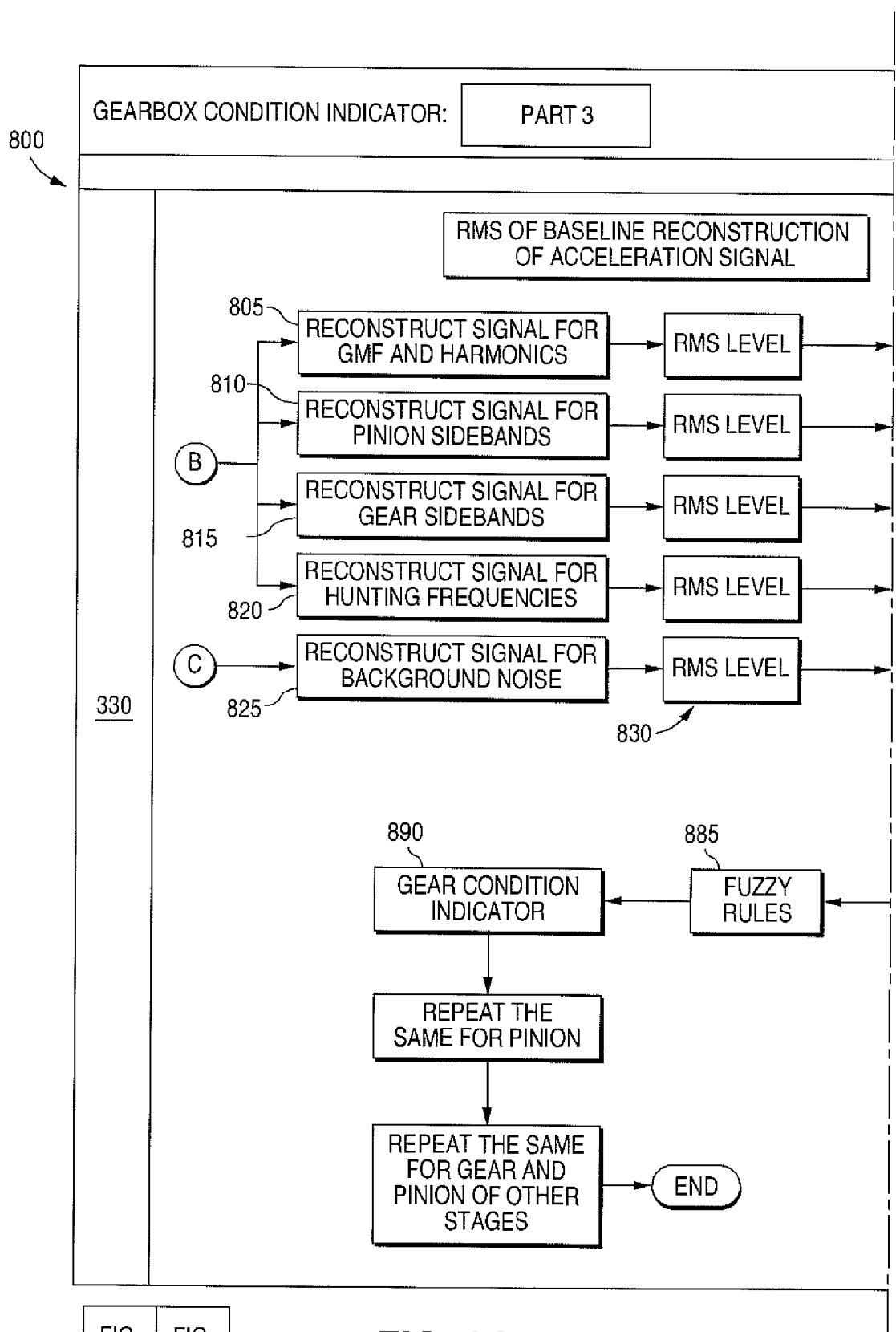
FIG. 8 illustrates a more detailed view of an example GCI third stage operation for monitoring a gearbox according to this disclosure.
Figure 8B:
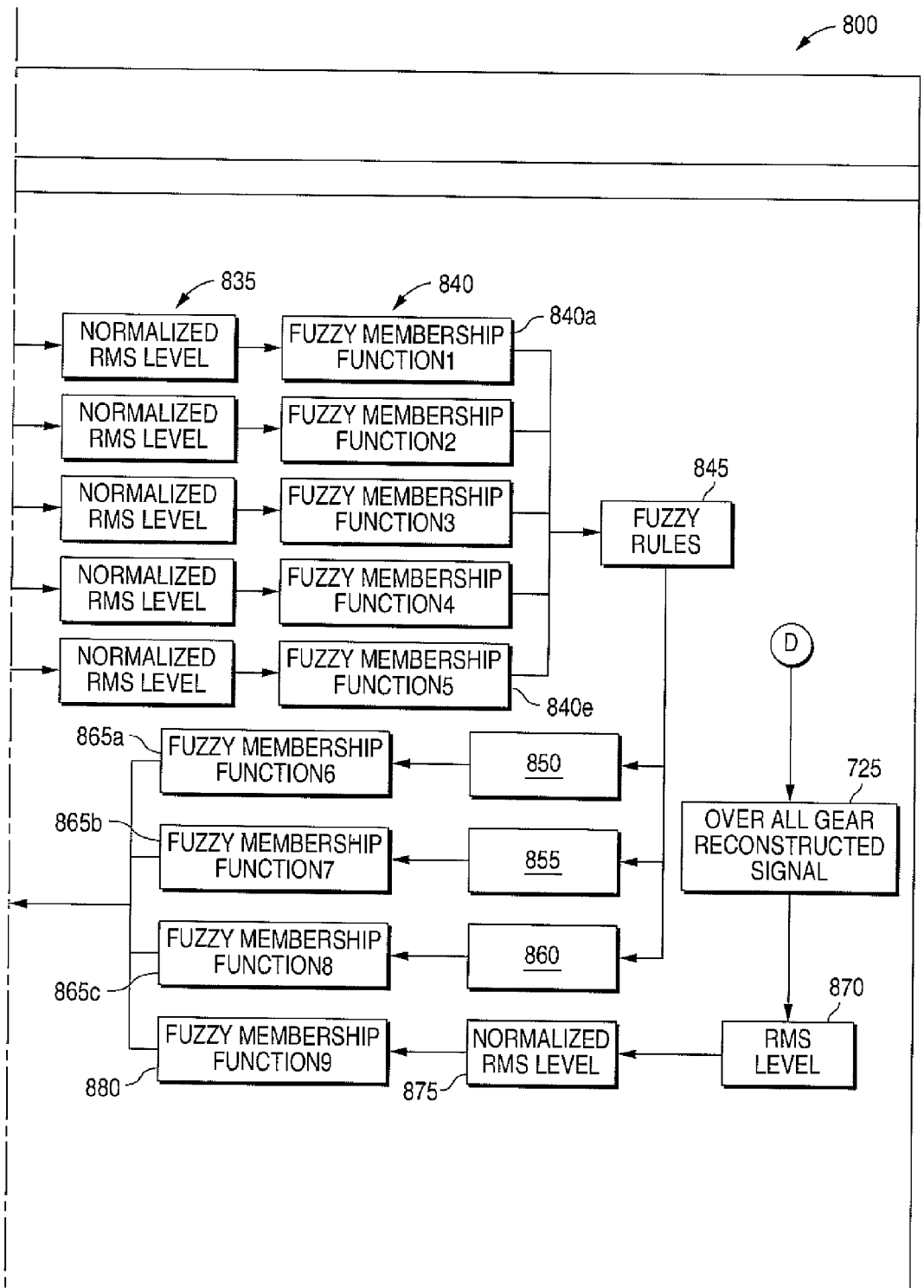

FIG. 8 illustrates a more detailed view of an example GCI third part operation 800 for monitoring a gearbox according to this disclosure. The embodiment of the GCI third stage operation 800 shown in FIG. 8 is for illustration only. Other embodiments of the GCI third stage operation 800 could be used without departing from the scope of this disclosure.

The AI portion 330 uses the matrix of maximum amplitudes and frequencies 710 to reconstruct a signal for the GMF and its harmonics 805, a signal for pinion standards 810, a signal for gear sidebands 815, and a signal for Hunting frequencies 820. Additionally, the AI portion 330 uses the matrix of minimum amplitudes and frequencies 715 to reconstruct a signal for background noise 825. Each of the signals 805-825 is passed through an RMS level detector 830, a normalized RMS level detector 835, and one of five fuzzy membership rules 840a-840e respectively. The outputs from the fuzzy membership rules 840a-840e are passed through fuzzy rules 845 to produce a fault indicating signal. The fuzzy membership functions and fuzzy rules could be replaced by other logic, such as when the rule-based diagnostics 348 are used.

The AI portion 330 compares the fuzzy rule signal to a number of indexes 850, 855, and 860. The AI portion 330 applies one of three additional fuzzy membership functions 865a-865c to the outputs of a gear pinion wear index 850, the output of a gear crack index 855, and the output of a pinion crack index 860. The AI portion 330 also applies an RMS level detector 870, a normalized RMS level detector 875, and a fuzzy membership function 880 to the overall reconstructed signal 725 for the gear. Thereafter, each of the signals from the fuzzy membership functions 865a-865c and 880 is sent to fuzzy rules 885 to produce a gear condition indicator 890.

The AI portion 330 repeats this process for the pinion. Additionally, the AI portion 330 repeats this process for each gear and pinion in additional gear stages. In this way, the GCI device 300 can determine a gear condition indicator 890 for each gear and pinion in each stage of a gearbox.

The gear condition indicators 890 reflect the health of a gearbox at each stage independent of various failure modes of the gearbox such as wear, crack/breakage at the pinion, and crack/breakage at the gear. In some embodiments, the GCI device 300 includes a number of threshold values stored in a memory, and the GCI device 300 can compare the gear condition indicators 890 to the threshold values stored in memory. The memory can be any computer readable medium, such as any electronic, magnetic, electromagnetic, optical, electro-optical, electro-mechanical, and/or other memory device that can contain, store, communicate, propagate, or transmit data. In particular embodiments, the threshold values could include a warning threshold and an alarm threshold for each gear condition indicator 890 calculated by the GCI device 300. The warning threshold could trigger a warning that a gear condition indicator 890 is high, while an alarm threshold could trigger an alarm that a fault has been detected in a gearbox.

Figure 9:
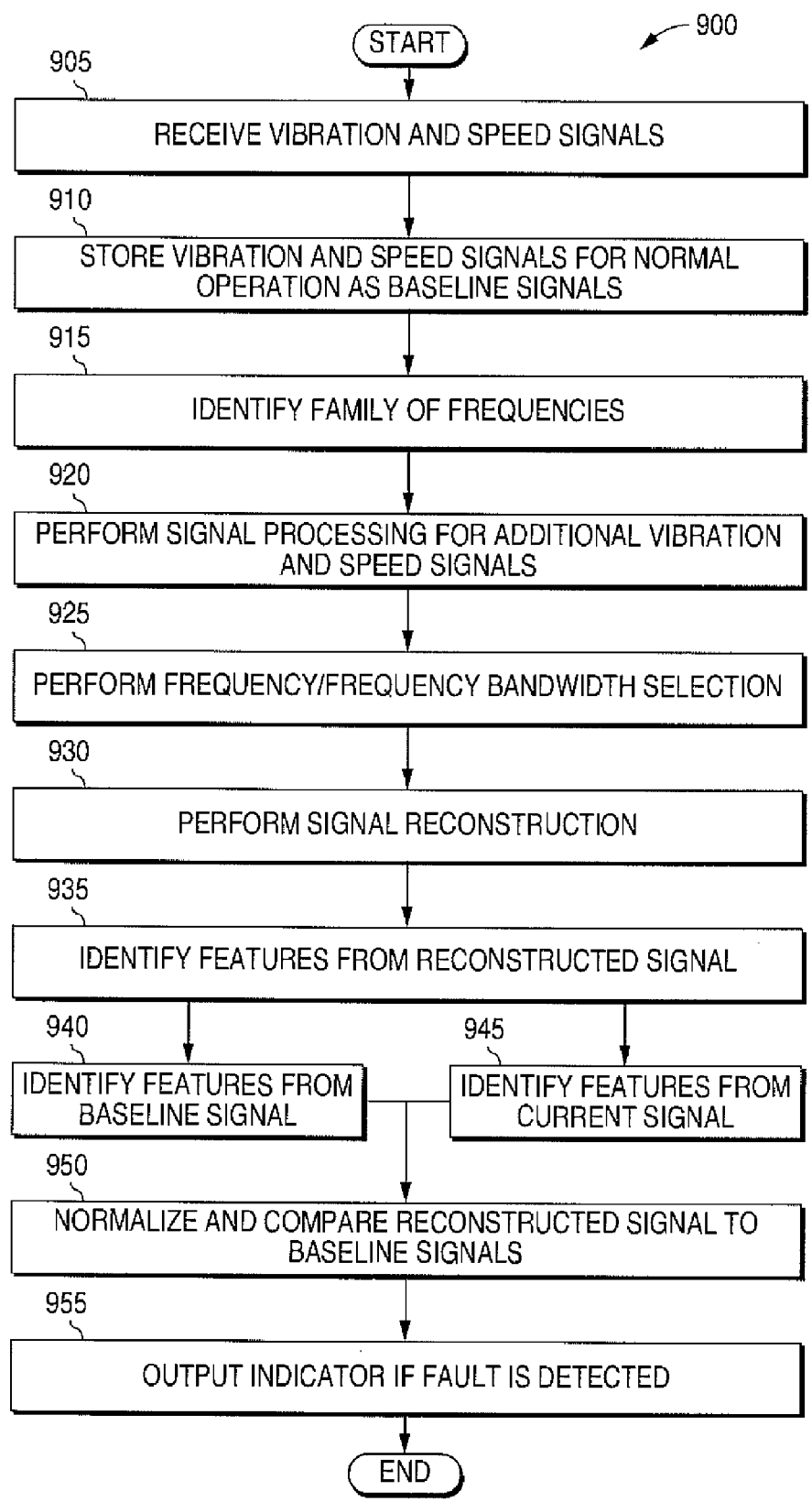
FIG. 9 illustrates an example process for monitoring a gearbox according to this disclosure.

FIG. 9 illustrates an example process 900 for monitoring a gearbox according to this disclosure. The embodiment of the process 900 shown in FIG. 9 is for illustration only. Other embodiments of the process 900 could be used without departing from the scope of this disclosure. Also, for ease of explanation, the process 900 is described with respect to the GCI device 300, although the process 900 could be used with any suitable device or system.

In this example, the GCI device 300 uses vibration and speed signals, as processed and compared to suitable thresholds, to determine appropriate maintenance for a gearbox. The vibration and speed signals are received by the GCI device 300 at step 905. The GCI device 300 stores the vibration and speed signals obtained during normal operation of the gearbox as baseline signals at step 910. The GCI device 300 determines the relevant family of frequencies for the gearbox at step 915. This may include, for example, determining the FoF 640 for each of the failure modes of the gearbox. The FoF 640 can include a GMF and its harmonics, sidebands of pinion shaft rotating frequencies around the GMF and its harmonics, and sidebands of the gear shaft rotating frequencies around the GMF and its harmonics. In some embodiments, more frequencies, such as tooth hunting frequencies and their respective harmonics, can also be determined. The GCI device 300 can determine the component frequencies for a gear, a pinion, and background noise.

The GCI device 300 continues to receive vibration and speed signals and performs signal processing at step 920. This may include, for example, decomposing the signal. The signal processing may also include a low-pass filter operation and an FFT analysis. The GCI device 300 performs frequency/frequency bandwidth selection using the processed signals at step 925. This may include, for example, isolating frequencies and obtaining minimum and maximum frequencies and amplitudes. The GCI device 300 reconstructs the signal at step 930, such as by reconstructing an overall signal and reconstructing signals for the GMF and harmonics, pinion sidebands, gear sidebands, Hunting frequencies, and background noise. The GCI device 300 finds statistical features from the reconstructed signal at step 935. For example, the GCI device 300 can determine features such as RMS and Kurtosis values. The GCI device 300 also identifies corresponding features in the base line signal in step 940 and the current signal in step 945. The reconstructed signals are normalized and compared to the baseline signals or other indices at step 950. The GCI device 300 then normalizes the features with respect to the features from baseline. For example, the reconstructed signals can be normalized by dividing the features from the current signal, found in step 945, by the features from the baseline, found in step 950. The normalizing helps to generalize the model with respect to the size of a mechanical system and application type. A Fuzzy feature fusion is performed to determine a failure mode indicator. The feature fusion technique also may include a Bayesian feature fusion or Dempster-Shafer feature fusion. The GCI device 300 performs fuzzy fusion of failure mode indicators to determine gear health indicator, as applied to thresholds to the condition indicator to detect faults. In the event features of a reconstructed signal exceed one of the thresholds, the GCI device 300 outputs the appropriate indicator (e.g., the gear system indicator, gear wear indicator, gear crack indicator, and/or pinion crack indicator) at step 955.

In some embodiments, the vibration and speed signals stored are for a gear that currently is experiencing wear or currently includes a crack. In such embodiments, the GCI device 300 provides a warning or alarm based on a change in the signals resulting from additional wearing or further cracking of the gear.

Figure 10:
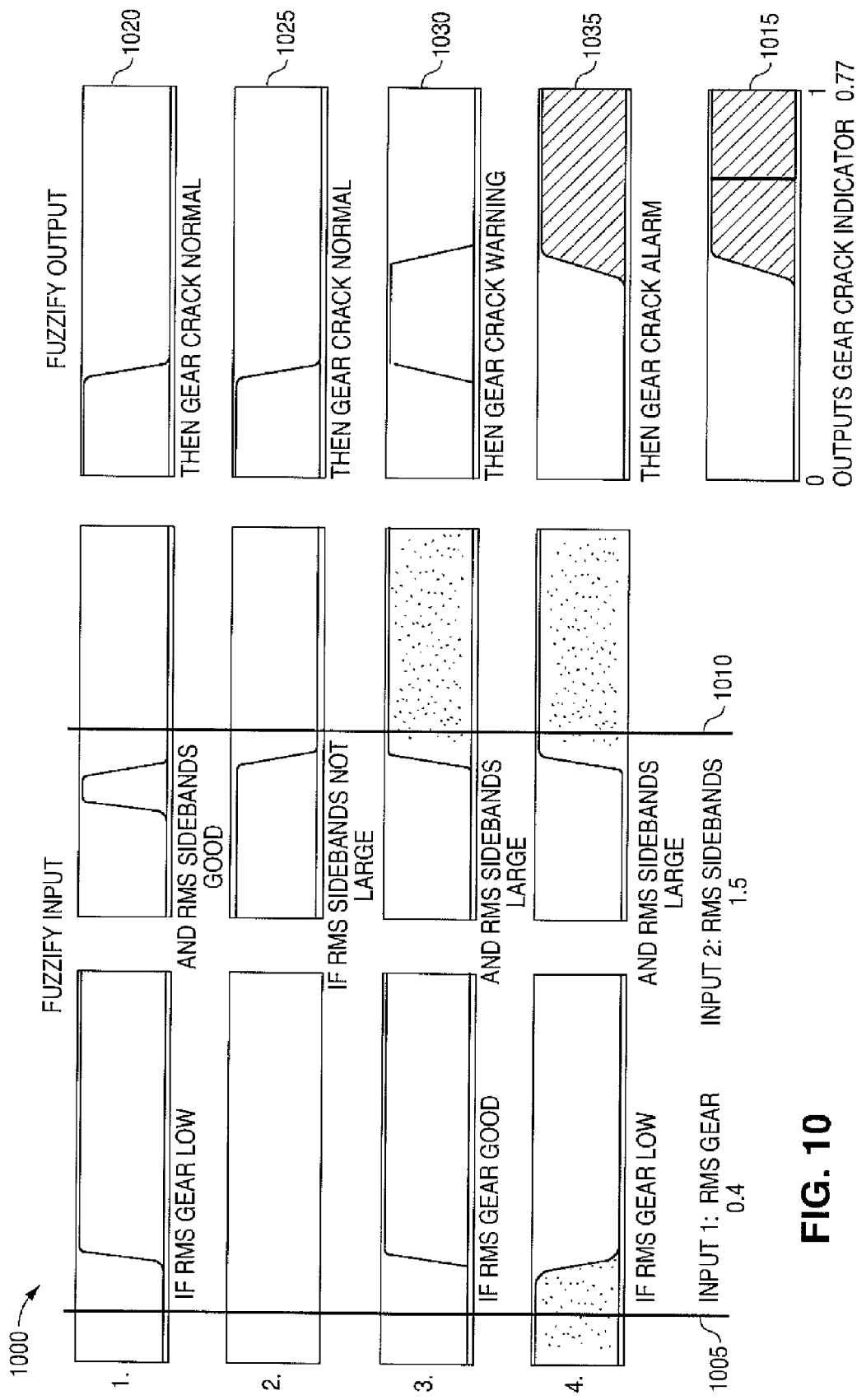
FIG. 10 illustrates an example fuzzification operation according to embodiments of the present disclosure.

FIG. 10 illustrates an example fuzzification operation according to embodiments of the present disclosure. The embodiment of the fuzzification operation 1000 shown in FIG. 10 is for illustration only. Other embodiments of the fuzzification operation 1000 could be used without departing from the scope of this disclosure.

The fuzzification operation 1000 includes a first input for RMS Gear values, a second input for RMS sideband values and an output. In one example, the first input threshold 1005 is set to 0.4 and a second input threshold 1010 is set to 1.5. Further, the output threshold 1015 is set to be 0.77 to trigger an alarm. If the RMS gear is low at the first threshold 1005 and low at the second threshold 1010, then the output is normal 1020. If the RMS gear is low at the first threshold 1005 and not large at the second threshold 1010, then the output is normal 1025. If the RMS gear is low at the first threshold 1005 and large at the second threshold 1010, then the output indicates a warning 1030. If the RMS gear is high at the first threshold 1005 and large at the second threshold 1010, then the output indicates an alarm 1035.

FIGS. 11A and 11B illustrate example gear health indicators according to this disclosure. The embodiment of the gear health indicators shown in FIGS. 11A and 11B is for illustration only. Other embodiments of the gear health indicators could be used without departing from the scope of this disclosure.

In this example shown in FIG. 11A, the GCI output interface 370 is a health indicator 1100 (which includes the indicators 372, 374 and 376 described in further detail above with respect to FIG. 3) that is constructed using a feature fusion of statistics on the basis of Fuzzy, Dempter-Shafer, or Bayesian theory. In another example shown in FIG. 11B, the GCI output interface 370 is a health indicator 1100' (which includes the indicators 372, 374 and 376 described in further detail above with respect to FIG. 3) that is constructed using a feature fusion of statistics on the basis of Fuzzy, Dempter-Shafer, or Bayesian theory. The health indicator 1100 (and/or 1100') provides a severity index varying between a value of 0 and a value of 1. The gear health indicator 1100 includes two threshold values 1105 and 1110 (and/or 1105' and 1110').

For example, if any indicator is in the range of 0.3-0.6, then the indicators provide a warning. However, if the range is between 0.6-1.0, then the indicators provide an alarm. There may be other combinations of alerts, alarms and/or warnings to users by either varying the alert thresholds or providing new alert names.

Although the figures above have illustrated various embodiments, any number of modifications could be made to these figures. For example, any suitable types of gearboxes could be monitored, and any suitable types of faults could be detected. Also, various functions shown as being performed by the GCI device 300 could be combined, further subdivided, or omitted and additional functions could be added according to particular needs. In addition, while FIG. 9 illustrates a series of steps, various steps in FIG. 9 could overlap, occur in parallel, occur multiple times, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   an input interface configured to receive an input signal associated with at least one stage of a gearbox;
   a processor configured to identify a fault in the gearbox using the input signal; and
   an output interface configured to provide an indicator identifying the fault;
   wherein the processor is configured to identify the fault by:
      determining a family of frequencies related to at least one failure mode of the gearbox, the family of frequencies including a gear mesh frequency and its harmonics comprising a first signal representing a harmonic from a first element in the gearbox and a second signal representing a sideband related to a second element within the gearbox;
      decomposing the input signal using the family of frequencies;
      reconstructing a gear signal using the decomposed input signal; and
      comparing the reconstructed gear signal to a baseline signal.

2. The apparatus of claim 1, wherein the reconstructed gear signal comprises at least one of:
   a signal associated with the gear mesh frequency and its harmonics;
   a signal associated with pinion sidebands;
   a signal associated with gear sidebands;
   a signal associated with hunting tooth frequencies; and
   a signal associated with background noise.

3. The apparatus of claim 1, wherein the processor is configured to decompose the input signal by decomposing the input signal through a plurality of band-pass filters.

4. The apparatus of claim 3, wherein the processor is configured to reconstruct the gear signal by:
   determining maximum and minimum frequencies and amplitudes in outputs of the band-pass filters;
   uniting the maximum frequencies and amplitudes to produce a first union;

uniting the minimum frequencies and amplitudes to produce a second union; and reconstructing multiple gear signals using the first and second unions.

5. The apparatus of claim 1, wherein the processor further is configured to identify the fault by:

normalizing the reconstructed signal with the baseline signal; and applying a feature fusion technique to obtain a value for use by the indicator.

6. The apparatus of claim 1, wherein the processor is further configured to store a portion of the input signal corresponding to normal operation of the gearbox as the baseline signal.

7. The apparatus of claim 1, wherein the indicator identifying the fault comprises at least one of: a gear system indicator, a gear wear indicator, a gear crack indicator, and a pinion crack indicator.

8. The apparatus of claim 1, wherein:

the input signal comprises at least one of: vibration information and speed information associated with the gearbox;

the input interface comprises multiple input interfaces; and the processor comprises an artificial intelligence.

9. A system comprising:

a plurality of sensors configured to measure one or more characteristics of a gearbox; and a gearbox condition indicator device comprising:

a plurality of sensor interfaces configured to receive input signals associated with at least one stage of the gearbox from the sensors;

a processor configured to identify a fault in the gearbox using the input signals; and an output interface configured to provide an indicator identifying the fault;

wherein the processor is configured to identify the fault by:

determining a family of frequencies related to at least one failure mode of the gearbox, the family of frequencies including a gear mesh frequency and its harmonics comprising a first signal representing a harmonic from a first element in the gearbox and a second signal representing a sideband related to a second element within the gearbox;

decomposing the input signals using the family of frequencies;

reconstructing a gear signal using the decomposed input signals; and comparing the reconstructed gear signal to a baseline signal.

10. The system of claim 9, wherein the reconstructed gear signal comprises at least one of:

a signal associated with the gear mesh frequency and its harmonics;

a signal associated with pinion sidebands;

a signal associated with gear sidebands;

a signal associated with hunting tooth frequencies; and a signal associated with background noise.

11. The system of claim 9, wherein the processor is configured to decompose the input signals by decomposing the input signals through a plurality of band-pass filters.

12. The system of claim 9, wherein the processor is configured to reconstruct the gear signal by:

determining maximum and minimum frequencies and amplitudes in outputs of the band-pass filters;

uniting the maximum frequencies and amplitudes to produce a first union;

uniting the minimum frequencies and amplitudes to produce a second union; and reconstructing multiple gear signals using the first and second unions.

13. The system of claim 9, wherein the processor is configured to store a portion of the input signals corresponding to normal operation of the gearbox as the baseline signal.

14. The system of claim 9, wherein the indicator identifying the fault comprises at least one of: a gear system indicator, a gear wear indicator, a gear crack indicator, and a pinion crack indicator.

15. A method comprising:

receiving an input signal comprising at least one of vibration and speed information corresponding to at least one stage of a gearbox;

determining a family of frequencies corresponding to at least one failure mode of the gearbox, the family of frequencies including a gear mesh frequency and its harmonics, comprising a first signal representing a harmonic from a first element in the gearbox and a second signal representing a sideband related to a second element within the gearbox;

decomposing the input signal using the family of frequencies;

reconstructing a gear signal using the decomposed input signal;

comparing the reconstructed gear signal to a baseline signal; and outputting an indicator identifying a fault when the reconstructed gear signal differs from the baseline signal by a threshold amount.

16. The method of claim 15, wherein the reconstructed gear signal comprises at least one of:

a signal associated with the gear mesh frequency and its harmonics;

a signal associated with pinion sidebands;

a signal associated with gear sidebands;

a signal associated with hunting tooth frequencies; and a signal associated with background noise.

17. The method of claim 15, wherein decomposing the input signal comprises decomposing the input signal through a plurality of band-pass filters; and wherein reconstructing the gear signal comprises:

determining maximum and minimum frequencies and amplitudes in outputs of the band-pass filters;

uniting the maximum frequencies and amplitudes to produce a first union;

uniting the minimum frequencies and amplitudes to produce a second union; and reconstructing multiple gear signals using the first and second unions.

18. The method of claim 15, further comprising:

normalizing the reconstructed signal with the baseline signal; and applying a feature fusion technique to obtain a value for use by the indicator.

19. The method of claim 15, further comprising:

storing a portion of the vibration and speed information corresponding to normal operation of the gearbox as the baseline signal.

20. The method of claim 15, wherein the threshold amount comprises a first amount associated with a warning and a second amount associated with an alarm.

* * * * *